US011582130B2

United States Patent
Borisov et al.

(10) Patent No.: US 11,582,130 B2
(45) Date of Patent: Feb. 14, 2023

(54) PERFORMANCE MONITORING IN A DISTRIBUTED STORAGE SYSTEM

(71) Applicant: Google LLC, Mountain View, CA (US)

(72) Inventors: Vadim Borisov, Sunnyvale, CA (US);
Andrew Fikes, Los Altos, CA (US);
Brian F. Cooper, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/902,228

(22) Filed: Jun. 15, 2020

(65) Prior Publication Data

US 2020/0382403 A1    Dec. 3, 2020

Related U.S. Application Data

(63) Continuation of application No. 15/348,181, filed on Nov. 10, 2016, now Pat. No. 10,686,686.
(Continued)

(51) Int. Cl.
*H04L 43/12* (2022.01)
*G06F 11/34* (2006.01)
(Continued)

(52) U.S. Cl.
CPC ............ *H04L 43/12* (2013.01); *G06F 9/5011* (2013.01); *G06F 11/3034* (2013.01);
(Continued)

(58) Field of Classification Search
None
See application file for complete search history.

(56) References Cited

U.S. PATENT DOCUMENTS

| 6,070,190 | A | 5/2000 | Reps et al. |
| 6,892,219 | B1 * | 5/2005 | Lerenc ............... G06F 11/32 |
| | | | 709/203 |

(Continued)

FOREIGN PATENT DOCUMENTS

| CN | 101782868 A | 7/2010 |
| CN | 102331989 A | 1/2012 |
| CN | 104717107 A | 6/2015 |

OTHER PUBLICATIONS

Chinese Office Acction for the related Application No. 201680047730. 4, dated Mar. 18, 2021, 23 pages.

*Primary Examiner* — Kevin S Mai
(74) *Attorney, Agent, or Firm* — Honigman LLP; Brett A. Krueger

(57) ABSTRACT

Methods and systems for monitoring performance in a distributed storage system described. One example method includes identifying requests sent by clients to the distributed storage system, each request including request parameter values for request parameters; generating probe requests based on the identified requests, the probe requests including probe request parameter values for probe request parameter values, representing a statistical sample of the request parameters included in the identified requests; sending the generated probe requests to the distributed storage system over a network, wherein the distributed storage system is configured to perform preparations for servicing each probe request in response to receiving the probe request; receiving responses to the probe requests from the distributed storage system, and outputting at least one performance metric value measuring a current performance state of the distributed storage system based on the received responses.

18 Claims, 5 Drawing Sheets

Related U.S. Application Data

(60) Provisional application No. 62/255,316, filed on Nov. 13, 2015.

(51) Int. Cl.
  *G06F 11/30* (2006.01)
  *G06F 9/50* (2006.01)
  *H04L 41/5009* (2022.01)
  *H04L 43/0852* (2022.01)
  *H04L 67/1097* (2022.01)

(52) U.S. Cl.
  CPC ...... *G06F 11/3093* (2013.01); *G06F 11/3096* (2013.01); *G06F 11/3414* (2013.01); *H04L 41/5009* (2013.01); *H04L 43/0852* (2013.01); *H04L 67/1097* (2013.01); *G06F 11/3452* (2013.01)

(56) References Cited

U.S. PATENT DOCUMENTS

| | | | |
|---|---|---|---|
| 2005/0197792 A1* | 9/2005 | Haeuptle | G05B 23/0235 702/66 |
| 2005/0216234 A1 | 9/2005 | Glas et al. | |
| 2011/0289232 A1 | 11/2011 | Douceur et al. | |
| 2012/0151068 A1* | 6/2012 | Su | H04L 43/0852 709/227 |
| 2016/0028608 A1* | 1/2016 | Dasgupta | H04L 43/16 370/252 |

* cited by examiner

PERFORMANCE MONITORING IN A DISTRIBUTED STORAGE SYSTEM

CROSS-REFERENCE TO RELATED APPLICATION

This U.S. patent application is a continuation of, and claims priority under 35 U.S.C. § 120 from, U.S. patent application Ser. No. 15/348,181, filed on Nov. 10, 2016, which claims priority under 35 U.S.C. § 119(e) to U.S. Provisional Application No. 62/255,316, filed Nov. 13, 2015. The disclosures of these prior applications are considered part of the disclosure of this application and are hereby incorporated by reference in their entireties.

BACKGROUND

This specification generally relates to monitoring performance in a distributed storage system.

In distributed systems, various performance metrics may be tracked to determine the overall health of the system. For example, the amount of time it takes the system to respond to a client request (i.e., latency) may be monitored to ensure the system is responding in a timely manner.

SUMMARY

In general, one aspect of the subject matter described in this specification may be embodied in systems, and methods performed by data processing apparatuses that include the actions of identifying requests sent by clients to the distributed storage system, each request including request parameter values for request parameters; generating probe requests based on the identified requests, the probe requests including probe request parameter values for probe request parameter values, representing a statistical sample of the request parameters included in the identified requests; sending the generated probe requests to the distributed storage system over a network, wherein the distributed storage system is configured to perform preparations for servicing each probe request in response to receiving the probe request; receiving responses to the probe requests from the distributed storage system; and outputting at least one performance metric value measuring a current performance state of the distributed storage system based on the received responses.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
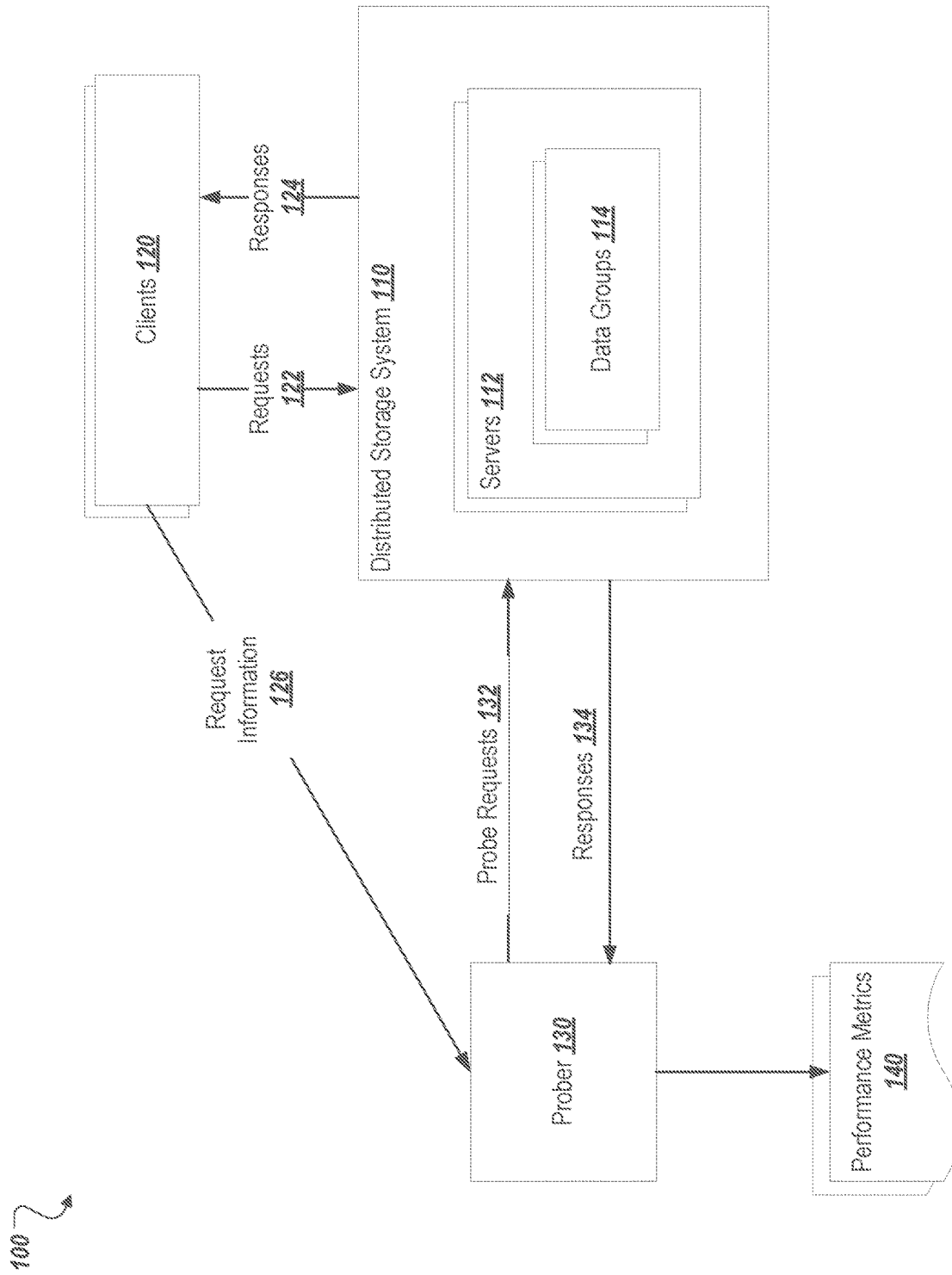
FIG. 1 is a diagram of an example environment for monitoring performance in a distributed storage system.

In a distributed storage system, there are many factors that may affect system performance. For example, clients may access the system over a public network such as the Internet. In such a case, performance problems anywhere in the public network may affect the performance of the distributed storage system from the perspective of each client. Problems with the distributed storage system itself, such as hardware failures, internal network failures, software bugs, or other problems, may also affect performance of the system as perceived from the client.

In some cases, the relationship between the distributed storage system and its clients may be subject to a service-level agreement (SLA). An SLA will generally include performance targets that the provider that the provider of the distributed storage system has agreed to meet in servicing client requests. For example, an SLA may indicate that the provider of the distributed storage system guarantees a latency of no more than 10 ms in processing a request. In some cases, the SLA may include actions to be taken when the performance target is not met, such as the provider issuing refunds to clients. Such agreements may also include provisions that the distributed storage system provider is not responsible for performance problems arising from situations outside its control (e.g., public network outages client network outages, client device issues).

Even in cases where an SLA is not in place, a distributed storage system provider may still want to monitor the health of the system in a way that is nonintrusive and does not affect the performance of the system when servicing requests for clients.

Accordingly, the present disclosure describes techniques for monitoring performance in a distributed database system by profiling client requests. One example method includes identifying requests sent by clients to the distributed storage system. The requests may include request parameters, such as a request type, concurrency parameters, and a request target indicating the data the request pertains to. In some cases, the requests may be identified based on information sent from clients of the distributed storage system. Based on these identified requests, probe requests are generated including probe request parameters representing a statistical sample of the request parameters included in the identified requests. The generated probe requests are sent to the distributed storage system, which responds by performing preparations for servicing each probe request, but does not actually access the data indicated by the request target. For example, in response to a probe request with a request type of "read," the distributed storage system may make preparations for reading the data indicated by the request target (e.g., locating the data, queueing the request, etc.), but may read a field associated with the data that is not client accessible. This allows the system to be profiled in a thorough manner without interfering with the processing of regular client requests. When responses to the probe requests are received from the distributed storage system, performance metrics may be calculated.

In some cases, the process may be carried out by the computing device co-located with distributed storage system (e.g., on the same internal network) in order to measure the performance of the distributed storage system alone, such that problems outside the control of the provider (e.g., public network outages) will not be indicated by the process.

The techniques described herein may provide the following advantages. By profiling actual client requests to generate probe requests, the present techniques allow a distributed storage system to be monitored using an approximation of client requests currently being serviced by the distributed storage system. In addition, by monitoring the health of the distributed storage system without accessing client accessible data, the performance impact of such monitoring on actual client requests may be minimized. Further, by monitoring the distributed storage system in isolation from other factors outside the control of the system provider, a more accurate view of the true performance of the system may be obtained. Such information may be useful when determining compliance with an SLA. The techniques may also provide statistical information about the distribution of client requests themselves (for example, whether a particular data item is more popular than others), which may enable the provider and clients to understand whether their workload should be adjusted (for example to avoid hotspots). In addition, the techniques allow the profiling of different aspects of the distributed storage system, such as queue time, actual processing time, server location time, along with server current CPU and memory utilization, queue length, and other metrics. Further, the techniques may allow for easier management of SLA/SLO compliance, since the profiling is controlled entirely by the provider of the distributed storage system.

FIG. 1 is a diagram of an example environment for monitoring performance in a distributed database system. As shown, the environment 100 includes a distributed storage system 110 including a plurality of servers 112 each managing a plurality of data groups 114. In operation, clients 120 send request 122 to the distributed storage system 110. The distributed storage system 110 processes the request 122 and sends responses 124 to the clients 120. The clients 120 send request information 126 to a prober 130. The request information 126 includes information about the requests sent to the distributed storage system 110 by the particular client 120, such as the request type, the request parameters, and the request target of each request. The prober 130 receives the request information 126 and sends probe request 132 to the distributed storage system 110 based on the request information 126. The distributed storage system 110 processes the probe requests, and returns responses 134 to the program 130. The prober 130 analyzes the responses and outputs performance metrics 140 indicating the current performance of the distributed storage system 110, particular servers 112 within the distributed storage system 110, particular data groups 114 within the distributed storage system 110, or indicating the current performance of other components within the distributed storage system 110.

The distributed storage system 110 may be a distributed system including a plurality of servers 112 connected by a local or private network (not shown). In some cases, the local or private network may be located entirely within a single facility, while in other cases the local or private network may cover a large area and interconnect multiple facilities. The servers 112 may communicate with one another in order to service the client request 122 by storing, retrieving, and updating data as requested by the clients 120. In some cases, the distributed storage system 110 may be a distributed database, a distributed file system, or other type of distributed storage. The distributed storage system 110 may also include components to manage and organize the operations of the servers 112 within the system.

Within the distributed storage system 110, each server 112 may be a computing device including a processor and a storage device, such as a hard drive, for storing data managed by the distributed storage system 110. In some cases, data may be distributed to the different servers 112 according to distribution policy. For example, a distribution policy may specify that a particular table or file within the distributed storage system 110 must be stored on a particular number of the servers 112 or to maintain redundancy. The distribution policy may also specify the data must be stored in multiple different locations in order to maintain geographic redundancy. In some cases, the server 112 may utilize an external storage device or system, such as a distributed file system, instead of a directly connected persistent storage.

Each of the servers 112 manages one or more data groups 114. The data groups 114 may include portions of the total data set managed by the distributed storage system 110. Each data group 114 may represent include data from a portion of a table in a distributed database, one or more files from a distributed file system, or other partitions of data within the distributed storage system 110. In operation, each request 122 and probe request 132 may be analyzed by distributed storage system 110 to determine, based on the request target the particular data group 114 to which the request or probe request pertains. The distribute storage system may then route the request or probe request to a particular server 112 managing the particular data group 114.

In some cases, the clients 120 may be users of the distributed storage system 110. The clients 120 may also be entities (e.g., websites or applications) using the distributed storage system 110 to store and retrieve data. Each of the clients 120 may record information about each request 122 it sends to the distribute storage system 110. In some cases, each client 120 may store record of the entire request as sent to the distributed storage system 110. Each client may also store a summary of the request 122 sent to the distribute storage system, such as, for example, storing a count of requests sent with the same set of request parameters. For example, the client 120 may record the fact that five requests were sent with the request type of "read," a concurrency parameter of "stale," and a request target of a table named "customers." This request information 126 may be sent by each client 120 to the prober 130, for example at regular intervals. The request information 126 may be sent by the clients 120 over a public network such as the Internet, to the prober 130. In some cases, the request information 126 may be collected by a software process or library running on the client and collecting the information about requests sent by the client. In some cases, the software library may be provided by the provider of the distributed storage system.

The prober 130 may analyze the request information received from the clients 120 and generate a probe profile representing a statistical approximation of the requests described by the request information 126. For example, the prober 130 may analyze request information 126 including 10,000 requests of type "read" and 5000 requests of type "write," and generate a probe profile indicating that 1000 probe requests of type "read" and 500 probe requests of type "write" should be sent in order to emulate and determine the distributed system's performance in processing the original request 122. In some cases, the prober 130 may choose a number of probe request 132 to generate so that the number is large enough to be representative of the request 122 sent by the clients 120, but small enough to have minimal impact on the performance of the distributed storage system 110.

Based on the probe profile, the prober 130 sends probe request 132 to the distribute storage system 110. In some cases, the probe requests 132 may be identical in format to the requests 122 sent by the clients 120, but may include an indication that they are probe requests and not requests from clients 120. Distribute storage system 110 may receive the probe requests 132, and process them in the same manner as the client requests 122, except that distributed storage system may not access the actual data indicated by the request target each probe request. In some cases, the distributed storage system 110 may instead access data specifically allocated for the prober 130, such as a special field, column, metadata value, or other value associated with the data indicated by the request target. In this way, the performance of several aspects of the distributed storage system 110 may be profiled without interfering with the processing of client requests 122. For example, probe requests including concurrency parameters that would cause a lock to be placed on the requested data may instead cause the distribute storage system 110 to place a lock on the prober specific data, so as not to interfere with client request processing. Such functionality allows the concurrency features of the distribute storage system 110 to be profiled without affecting the processing of client requests.

As shown, the prober 130 produces one or more performance metrics 140 based on the probe request 132 sent and the responses 134 received, in some cases, the performance metrics may include overall system latency, as measured by the average amount of time it takes the distributed storage system 110 to respond to a probe request. The performance metrics may also include availability, as measured by the ratio of failed probe requests to successful probe requests. The performance metrics may also include a local network latency, server queue latency (e.g., the average amount of time each probe request 132 waits at a server before being processed), disk or memory latency or other performance metrics.

Figure 2:
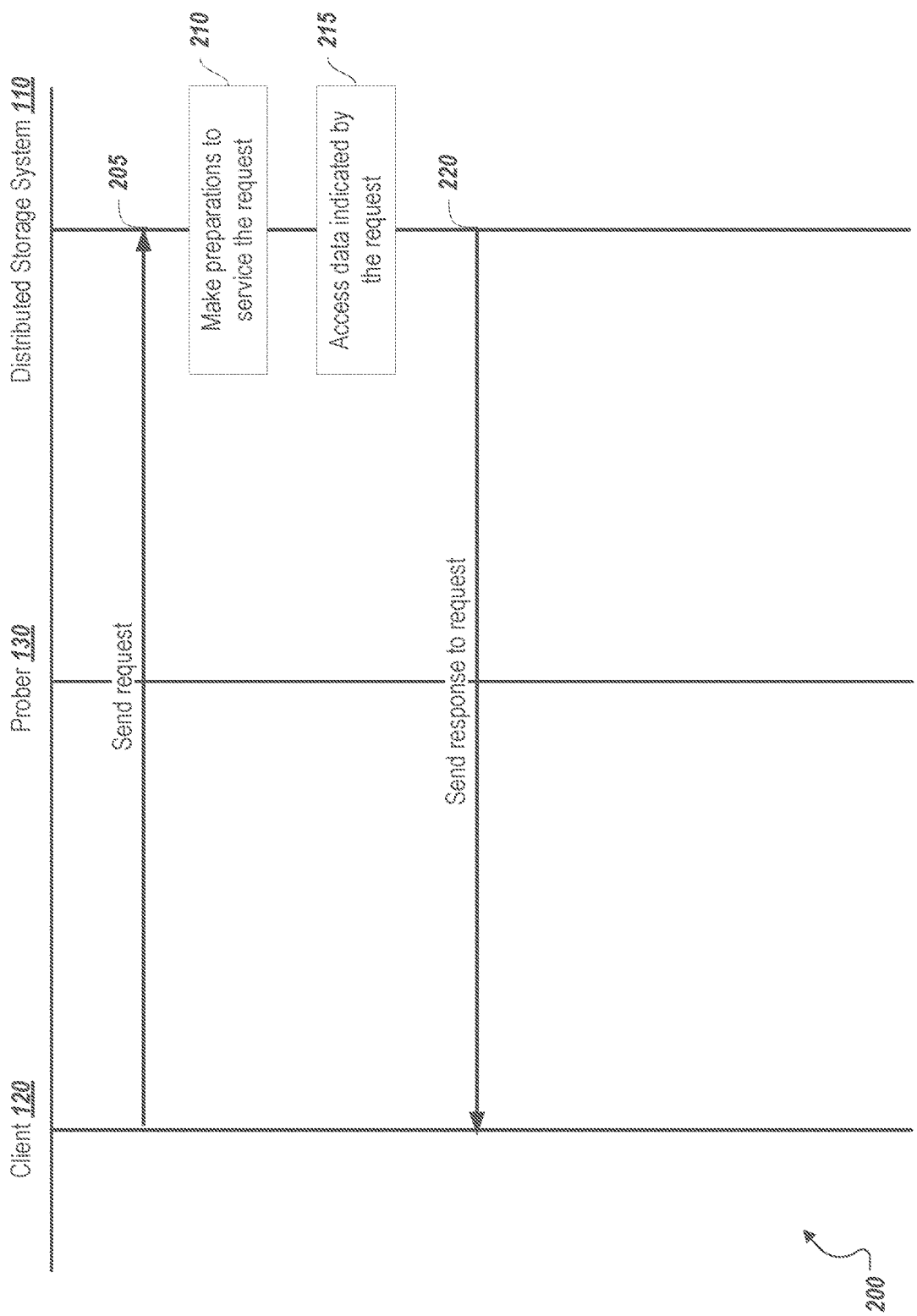
FIG. 2 is a swim lane diagram of an example process for processing a client request in a distributed storage system.

FIG. 2 is a swim lane diagram of an example process for processing a client request in the distributed storage system. In that 205, the client 120 sends a request to the distributed storage system 110. At 210, the distribute storage system 110 makes preparations to service the request. For example, the preparations made by the distribute storage system 110 may include parsing the request, determining a particular server storing the requested data, sending the request to the particular server, generating an execution plan for the particular request (e.g., determining which tables to access and how to manipulate the data to fulfill the request), or other operations. At 215, the distribute storage system 110 accesses the data indicated by each request. This is in contrast to the distributed storage system 110's handling of probe requests, in which the data indicated by the requests may not be accessed (as described below). At 220, the distributed storage system 110 sends a response to the request to the client. For example, if the client has requested to read particular data from the distributed storage system 110, the response may include the requested data.

Figure 3:
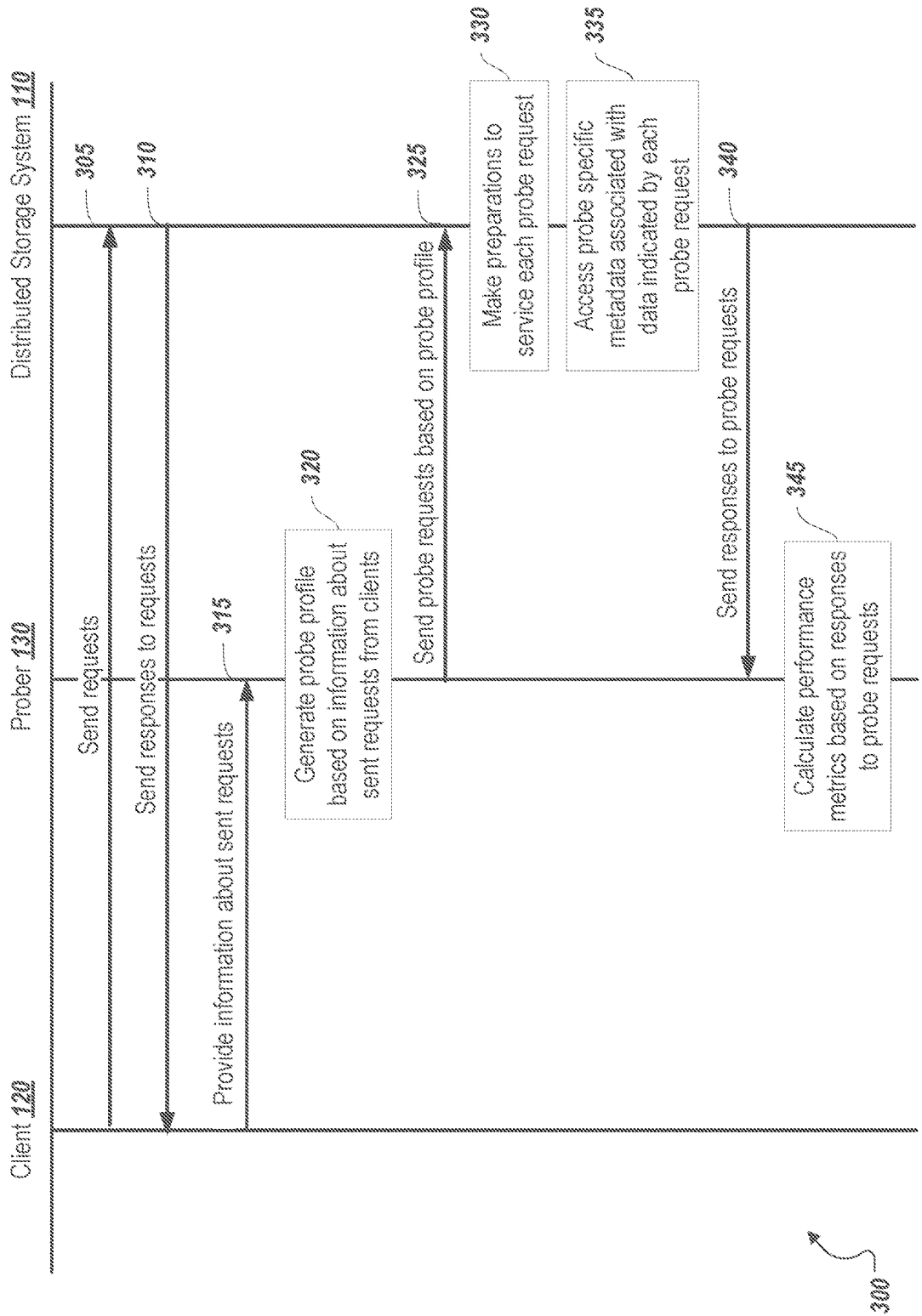
FIG. 3 is a swim lane diagram of an example process for monitoring performance in a distributed storage system.

FIG. 3 is a swim lane diagram of an example process for monitoring performance in a distributed database system. At 305, the client 120 sends requests to the distributed storage system 110, which responds with responses to the requests at 310. At 315 the client 120 provides information about the sent request to the prober 130. At 320, the prober 130 generates a probe profile based on information about the requests sent by the client. In some cases, the prober may receive information about sent requests from multiple clients, and generate the probe profile based on this information. At 325, the prober 130 sends probe requests based on the probe profile to the distribute storage system 110. At 330, the distributed storage system 110 makes preparations to service each probe request. At 335, the distributed storage system 110 accesses probe specific metadata associated with the data indicated by the request target of each probe request. At 340, the distribute storage system 110 sends responses to the probe requests to the prober 130. At 345, the prober calculates performance metrics based on the responses to the probe requests.

Figure 4:
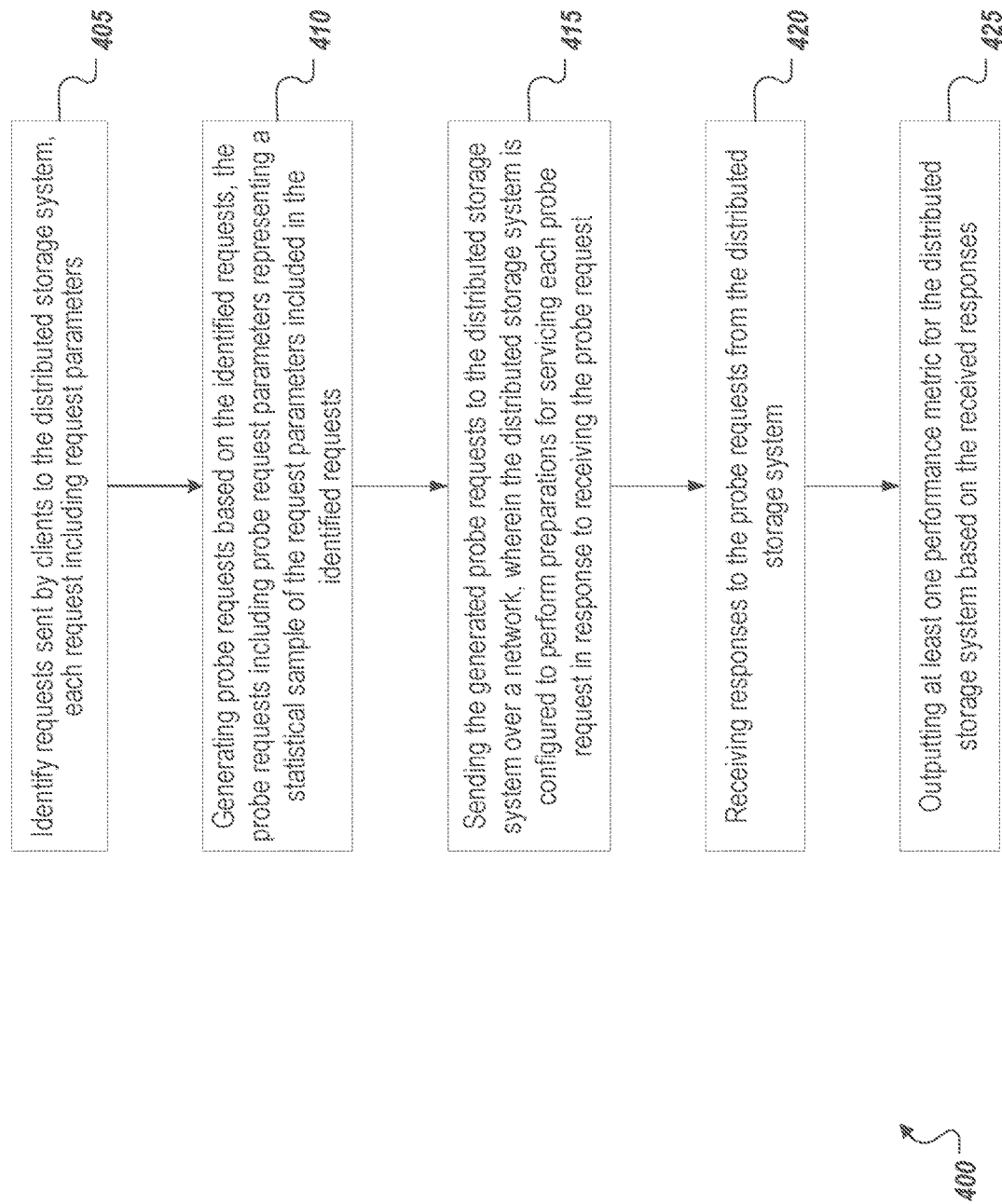
FIG. 4 is a flow chart of an example process for monitoring performance in a distributed storage system.

FIG. 4 is a flow chart of an example process for monitoring performance in a distributed database system. At 405, requests sent by clients to the distributed storage system are identified, each request including request parameters. In some cases, the request parameters include a request type, concurrency parameters and a request target indicating data within the distributed storage system to which the request pertains.

At 410, probe requests are generated based on the identified requests. The probe requests include probe request parameters representing a statistical sample of the request parameters included in the identified requests. In some cases, generating the probe requests includes generating a number of probe requests less than the number of identified requests. Generating the probe requests may include generating a number of probe requests including a particular request type, particular concurrency parameters, and a particular request target that is proportional to a number of identified requests including the particular request type, the particular concurrency parameters, and the particular request target.

At 415, the generated probe requests are sent to the distributed storage system over a network. The distribute storage system is configured to perform preparations for servicing each probe request in response to receiving the probe request. In some cases, the distributed storage system is configured not to read or write any data accessible to the clients when performing the preparations for servicing each probe request in response to receiving the probe request. In some implementations, the data in the distributed storage system includes a probe field that is not accessible to the clients, and wherein the distributed storage system is configured to access the probe field associated with a request target in a probe request in response receiving the probe request.

At 420, responses to the probe requests are received from the distributed storage system. At 425, at least one performance metric for the distributed storage system is output based on the received responses. In some cases, outputting the at least one performance metric includes outputting a weighted average of the at least one performance metric for a particular data group of the distributed storage system based on responses to probe requests including request targets identifying data in the particular data group. The at least one performance metric may include at least one of availability, disk latency, queue latency, request preparation latency, or internal network latency. In some cases, the performance metrics may include weighted averages, with the weights used in the calculation derived from the request information 126. For example, if there are 10 times as many requests for stale concurrency as for strong concurrency, performance data for stale concurrency probe requests may be 10 times as heavy as for strong concurrency probes in the ensuing performance metrics.

In some cases, the process 400 includes comparing the at least one performance metric to a service level objective (SLO) including a target value for the at least one performance metric for the distributed storage system. The SLO may be included within a service level agreement (SLA) for the distributed storage system. The process 400 may also include determining that the at least one performance metric does not meet the target value, and outputting an indication that the at least one performance metric does not meet the target value.

Figure 5:
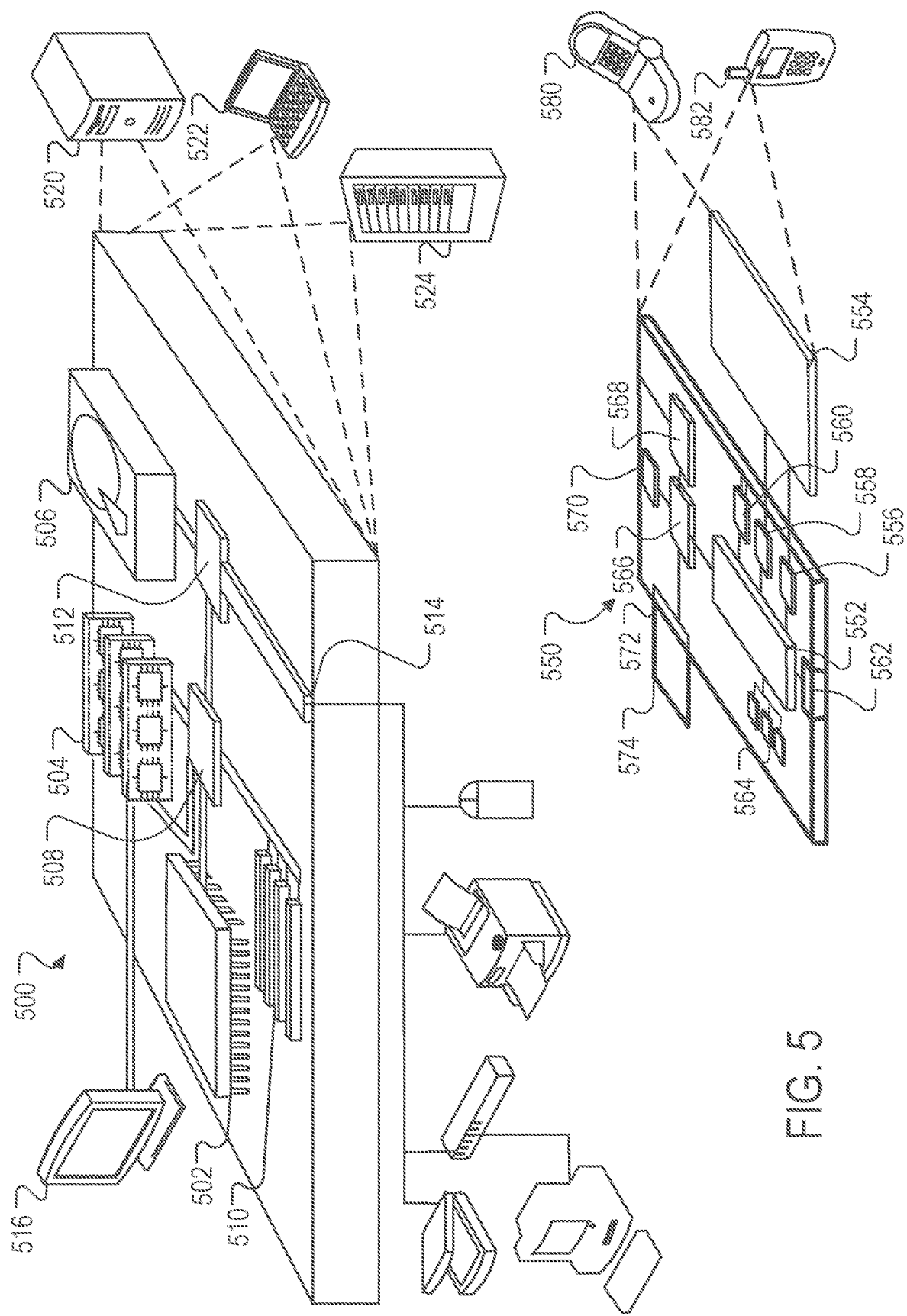
FIG. 5 is a diagram of computing devices that may be used to implement the systems and methods described in this document.

FIG. 5 is a block diagram of computing devices 600, 650 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device or a tape device a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only.

In one implementation, the high-speed controller 508 is coupled to memory 504 display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:
1. A method comprising:
 receiving, at data processing hardware, a client request requesting access to a target resource of a distributed storage system, the distributed storage system compris- ing a plurality of data groups, the target resource indicating a respective data group among the plurality of data groups;

in response to receiving the client request, generating, by the data processing hardware, a health probe request comprising a probe profile based on the client request, the health probe request configured to identify an availability of the target resource of the distributed storage system based on the probe profile and a probe specific data group associated with the indicated respective data group, the probe specific data group independent from the indicated respective data group;

communicating, by the data processing hardware, the health probe request to the distributed storage system;

receiving, at the data processing hardware, a response to the health probe request, the response generated without the distributed storage system performing any read or write operations on the target resource; and generating, by the data processing hardware, a health performance metric based on the response from the health probe request, the health performance metric identifying the availability of the target resource.

2. The method of claim 1, wherein communicating the health probe request to the distributed storage system occurs while another client request requests access to the target resource of the distributed storage system.

3. The method of claim 1, wherein generating the health performance metric based on the response from the health probe request comprises determining whether the health probe request fails or succeeds in identifying the availability of the target resource based on the probe specific data group.

4. The method of claim 1, wherein generating the health performance metric based on the response from the health probe request comprises:
  determining whether the health probe request fails or succeeds in identifying the availability of the target resource based on the probe specific data group; and
  representing the health performance metric identifying the availability of the target resource by a ratio of health probe request failures to health probe request successes.

5. The method of claim 1, further comprising comparing, by the data processing hardware, the health performance metric to a service level objective (SLO) comprising a target value for the health performance metric for the availability of the target resource.

6. The method of claim 5, further comprising:
  determining, by the data processing hardware, that the health performance metric does not meet the target value; and
  communicating, by the data processing hardware, an indication that the health performance metric does not meet the target value.

7. The method of claim 5, wherein a service level agreement (SLA) for the distributed storage system comprises the service level objective.

8. The method of claim 1, wherein the data processing hardware is co-located with the distributed storage system.

9. The method of claim 1, wherein communicating the health probe request to the distributed storage system occurs at regular intervals.

10. A system comprising:
  data processing hardware; and
  memory hardware in communication with the data processing hardware and storing instructions, that when executed on the data processing hardware, cause the data processing hardware to perform operations comprising:
    receiving a client request requesting access to a target resource of a distributed storage system, the distributed storage system comprising a plurality of data groups, the target resource indicating a respective data group among the plurality of data groups;
    in response to receiving the client request, generating a health probe request comprising a probe profile based on the client request, the health probe request configured to identify an availability of the target resource of the distributed storage system based on the probe profile and a probe specific data group associated with the indicated respective data group, the probe specific data group independent from the indicated respective data group;
    communicating the health probe request to the distributed storage system;
    receiving a response to the health probe request, the response generated without the distributed storage system performing any read or write operations on the target resource; and
    generating a health performance metric based on the response from the health probe request, the health performance metric identifying the availability of the target resource.

11. The system of claim 10, wherein communicating the health probe request to the distributed storage system occurs while another client request requests access to the target resource of the distributed storage system.

12. The system of claim 10, wherein generating the health performance metric based on the response from the health probe request comprises determining whether the health probe request fails or succeeds in identifying the availability of the target resource based on the probe specific data group.

13. The system of claim 10, wherein generating the health performance metric based on the response from the health probe request comprises:
  determining whether the health probe request fails or succeeds in identifying the availability of the target resource based on the probe specific data group; and
  representing the health performance metric identifying the availability of the target resource by a ratio of health probe request failures to health probe request successes.

14. The system of claim 10, wherein the operations further comprise comparing the health performance metric to a service level objective (SLO) comprising a target value for the health performance metric for the availability of the target resource.

15. The system of claim 14, wherein the operations further comprise:
  determining that the health performance metric does not meet the target value; and
  communicating an indication that the health performance metric does not meet the target value.

16. The system of claim 14, wherein a service level agreement (SLA) for the distributed storage system comprises the service level objective.

17. The system of claim 10, wherein the data processing hardware is co-located with the distributed storage system.

18. The system of claim 10, wherein communicating the health probe request to the distributed storage system occurs at regular intervals.

* * * * *